R. R. CUNNINGHAM.
SLIP JOINT FLOOR FLANGE FOR SUPPLY PIPES.
APPLICATION FILED FEB. 26, 1914.

1,179,808.

Patented Apr. 18, 1916.

WITNESSES
E. A. Joyner
M. F. Terry

INVENTOR
Robert R Cunningham
BY
F. N. Gilbert
ATTORNEY

UNITED STATES PATENT OFFICE.

ROBERT R. CUNNINGHAM, OF LESTERSHIRE, NEW YORK.

SLIP-JOINT FLOOR-FLANGE FOR SUPPLY-PIPES.

1,179,808.   Specification of Letters Patent.   Patented Apr. 18, 1916.

Application filed February 26, 1914.   Serial No. 821,141.

*To all whom it may concern:*

Be it known that I, ROBERT R. CUNNINGHAM, a citizen of the United States, residing at Lestershire, in the county of Broome and State of New York, have invented certain new and useful Improvements in Slip-Joint Floor-Flanges for Supply-Pipes, of which the following is a specification.

My invention relates to an improvement in slip joint or screw joint floor flanges for supply pipes and it has for its object to provide a joint whereby a connection may be made between piping passing through floors and between the floor surfaces and ceilings so as to enable a connection or disconnection between the piping to take place or between the union or one part of the union of said piping and at the same time not have the other union disturbed, so that leaks between floors or between the floor surface and ceiling surface, may be prevented when disconnections are made between the piping above and beneath the floors.

With this object in view my invention consists of certain novel features of construction and arrangement of parts as will be hereinafter fully described and pointed out in the claims.

Figure 1:
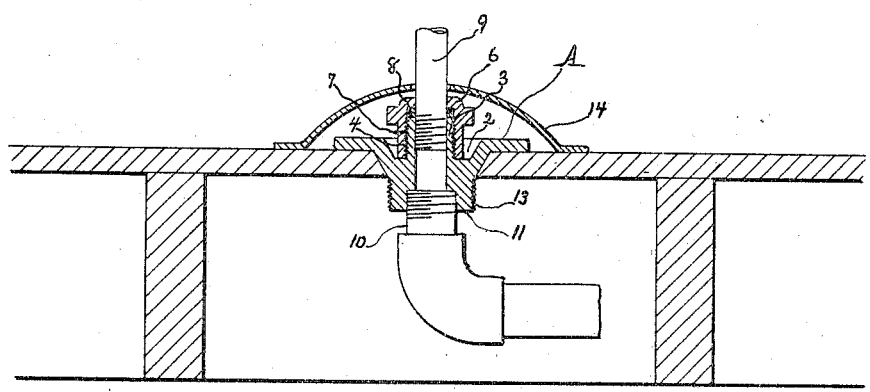
Figure 2:
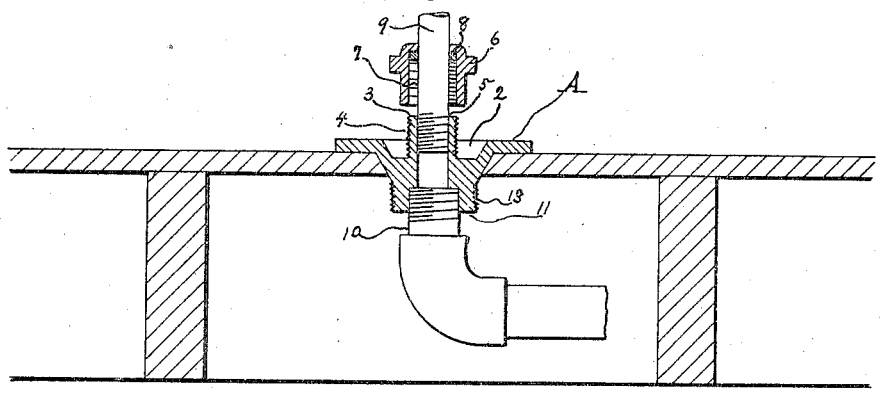
Figure 3:
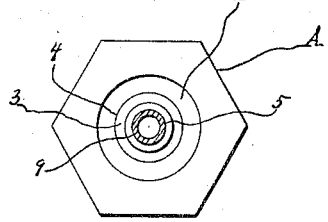

Reference being had to the accompanying drawings, Figure 1 is a side view of my device in cross section mounted on a floor, the union connection being made and a floor cap mounted upon the floor. Fig. 2 is a side view of my device in cross section without the floor cap and with the union disconnected above the floor. Fig. 3 is a plan view of my device.

The same reference characters denote like parts in each of the several figures of the drawing.

In carrying out my invention I provide a hexagonal floor flange A having within it the recess channel 2 and projecting from its center the neck 3 having the outer threaded surface 4 and the inner tubular opening 5 which opening may have an inner threaded surface or a smooth surface. Over the neck 3 I have a tubular cap 6 having an inner threaded surface 7 which forms a union with the threaded surface 4. Within the top of the cap 6 I have the packing ring 8. Through the tubular cap 6 I insert the connecting pipe 9 which may have a smooth outer surface or a threaded outer surface 10. I insert the pipe 9 into the opening 5 of the neck 3, the pipe 9 passing down into A.

At the base of the body portion A I have a threaded tubular opening in which I have mounted the threaded pipe 10. On the outer surface of the base of A I have a series of threads 13 adapted to form a connection with a threaded pipe of that size. On the floor surface and over the tubular cap 6 I have mounted the usual floor cap 14.

Having thus described my invention, what I claim as new and for which I desire Letters Patent is as follows:

A device of the class described comprising a flat flange portion having a central opening therethrough, said flange portion adapted to rest upon a floor around an opening therein, a tubular boss depending from the flange portion and seated in the opening in the floor, the bore of the boss being concentric with the opening in the flange portion and adapted for connection with a pipe beneath the floor, a tubular neck projecting from the upper surface of the flange portion and surrounding the opening therein and adapted to receive a pipe, and a cap surrounding the pipe and having threaded engagement with the neck, there being an annular recess in the flange around the neck to receive the lower end of the cap when screwed down.

In testimony whereof I have affixed my signature in presence of two witnesses.

ROBERT R. CUNNINGHAM.

Witnesses:
  E. A. JOYNES,
  M. F. TERRY.

Copies of this patent may be obtained for five cents each, by addressing the "Commissioner of Patents, Washington, D. C."